United States Patent
Chen et al.

(10) Patent No.: US 10,949,999 B2
(45) Date of Patent: *Mar. 16, 2021

(54) LOCATION DETERMINATION USING STREET VIEW IMAGES

(71) Applicant: International Business Machines Corporation, Armonk, NY (US)

(72) Inventors: Xiao Long Chen, Beijing (CN); Na Lv, Beijing (CN); Zhe Yan, Beijing (CN); Yun Zhai, Pound Ridge, NY (US); Zhuo Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,252

(22) Filed: Sep. 25, 2019

(65) Prior Publication Data

US 2020/0020129 A1     Jan. 16, 2020

Related U.S. Application Data

(63) Continuation of application No. 15/585,721, filed on May 3, 2017.

(51) Int. Cl.
*H04W 24/00*    (2009.01)
*G06T 7/73*    (2017.01)
(Continued)

(52) U.S. Cl.
CPC ...... *G06T 7/74* (2017.01); *G06T 2207/20072* (2013.01); *G06T 2207/30244* (2013.01);
(Continued)

(58) Field of Classification Search
CPC ... G06T 7/74; G06T 7/13; G06T 2207/20072; G06T 2207/30244; G06T 2207/30252;
(Continued)

(56) References Cited

U.S. PATENT DOCUMENTS 8,472,664 B1    6/2013  Jing
8,483,715 B2    7/2013  Chen
(Continued)

FOREIGN PATENT DOCUMENTS

WO    2017125338 A1    7/2017

OTHER PUBLICATIONS

List of IBM Patents or Patent Applications Treated as Related. Filed Herewith. 2 pages.
(Continued)

*Primary Examiner* — Danh C Le
(74) *Attorney, Agent, or Firm* — Edward Li

(57) ABSTRACT

A method, a computer program product, and a computer system for determining a location using street view images. A mobile device obtains an image captured by the mobile device, obtains a set of street view images, and obtains a first graph of the image captured by the mobile device and a plurality of second graphs of the set of the street view images. The first graph includes nodes representing interest points in the image captured by the mobile device, and the plurality of the second graphs includes nodes representing interest points in the set of the street view images. The mobile device determines a location of the mobile device, based on relevance between the first graph and the plurality of the second graphs.

20 Claims, 12 Drawing Sheets

(51) Int. Cl.
*H04W 88/02* (2009.01)
*H04M 1/725* (2021.01)

(52) U.S. Cl.
CPC ............ *G06T 2207/30252* (2013.01); *H04M 1/72519* (2013.01); *H04M 1/72522* (2013.01); *H04W 88/02* (2013.01)

(58) Field of Classification Search
CPC ............ H04W 88/02; H04M 1/72519; H04M 1/72522
USPC ................ 455/456.1, 456.5, 550.1
See application file for complete search history.

(56) References Cited

U.S. PATENT DOCUMENTS

| | | | |
|---|---|---|---|
| 8,688,368 B2 | 4/2014 | Ofek | |
| 8,972,174 B2 | 3/2015 | Jeung | |
| 9,467,660 B1 | 10/2016 | Edelstein | |
| 9,619,224 B2* | 4/2017 | Tibble | G06F 16/9024 |
| 10,013,153 B1 | 7/2018 | Freeman | |
| 10,028,101 B2* | 7/2018 | Deng | H04W 4/21 |
| 10,147,399 B1 | 12/2018 | Mott | |
| 10,242,412 B2* | 3/2019 | Deng | G06Q 50/01 |
| 10,474,985 B2* | 11/2019 | Cen | G06Q 10/08355 |
| 2008/0249702 A1 | 10/2008 | Ofek | |
| 2009/0092277 A1 | 4/2009 | Ofek | |
| 2010/0002941 A1 | 1/2010 | Fonseca | |
| 2010/0191459 A1 | 7/2010 | Carter | |
| 2010/0250136 A1 | 9/2010 | Chen | |
| 2010/0251101 A1 | 9/2010 | Haussecker | |
| 2011/0098917 A1 | 4/2011 | Lebeau | |
| 2013/0195363 A1 | 8/2013 | Janky et al. | |
| 2013/0332066 A1 | 12/2013 | Jeung | |
| 2014/0019301 A1 | 1/2014 | Meadow | |
| 2014/0064624 A1 | 3/2014 | Kim et al. | |
| 2014/0223415 A1* | 8/2014 | van Gogh | G06F 8/75 717/123 |
| 2015/0161441 A1 | 6/2015 | Robinson | |
| 2015/0271280 A1* | 9/2015 | Zhang | H04L 67/10 709/224 |
| 2015/0304368 A1* | 10/2015 | Vaccari | G06F 17/3028 709/206 |
| 2016/0150032 A1* | 5/2016 | Kao | H04L 67/18 709/203 |
| 2017/0054899 A1 | 2/2017 | Sadhwani | |
| 2017/0068857 A1 | 3/2017 | Lee | |
| 2017/0103259 A1 | 4/2017 | Anastassov et al. | |
| 2017/0178359 A1 | 6/2017 | Spiessl | |
| 2017/0351397 A1* | 12/2017 | Won | G06F 3/03545 |
| 2018/0015369 A1* | 1/2018 | Schupak | G06T 11/60 |
| 2018/0041685 A1 | 2/2018 | Carbonell | |
| 2018/0234832 A1* | 8/2018 | Bucchieri | H04W 8/14 |
| 2018/0322654 A1 | 11/2018 | Chen | |

OTHER PUBLICATIONS

Liu et al. "Finding perfect rendezvous on the go: accurate mobile visual localization and its applications to routing." MM'12, Oct. 29-Nov. 2, 2012, Nara, Japan. Copyright 2012 ACM 978-1-4503-1089—May 12, 2010, <https://www.microsoft.com/en-us/research/wp-content/uploads/2016/02/fp066-liu.pdf>.

Zamir "Using location to see!" Stanford University Geotagging and Geospatial Analysis May 11, 2015. pp. 1-113, <http://web.stanford.edu/class/cs231m/lectures/lecture-13-geo.pdf>.

Zamir et al. "Accurate image localization based on Google maps street view1" K. Daniilidis, P. Maragos, N. Paragios (Eds.):ECCV 2010, Part IV, LNCS 6314, pp. 255-268, 2010. Copyright Springer-Verlag Berlin Heidelberg 2010, <http://visionnas2.cs.ucf.edu/news/Zamir_ECCV_2010.pdf>.

* cited by examiner

LOCATION DETERMINATION USING STREET VIEW IMAGES

BACKGROUND

The present disclosure relates generally to navigation technology, and more particularly to determining a location using street view images.

Navigation devices are widely used to help a user to arrive at a desired destination. A navigation device is generally equipped with a positioning module such as a Global Position System (GPS) module such that the navigation device may provide the user with a geographical location of the device. For example, the navigation device may be a mobile device such as mobile phone, tablet computer, a vehicle navigator, and so on. A navigation application, such as a map application, may run on the mobile device and provide the user with a graphical user interface (GUI) for navigation to the destination.

Street view images are actual photographs or still images captured at many geographical locations. Such images may provide the user with the ability to view a geographical location from a street view perspective. The street view images may be taken by, for example, a vehicle-mounted camera that captures images as the vehicle drives along a street. At each geographical location, multiple images corresponding to multiple direction angles may be taken to capture a panorama view. For example, a vehicle-mounted camera may utilize eight different lenses that capture eight different street view images at direction angle increments of 45 degrees from a specific geographical location.

SUMMARY

Embodiments of the present disclosure provide a new approach for determining a location using street view images.

In one aspect, a method for determining a location using street view images is provided. The method comprises obtaining, by a mobile device, an image captured by the mobile device. The method further comprises obtaining, by the mobile device, a set of street view images. The method further comprises obtaining, by the mobile device, a first graph of the image captured by the mobile device and a plurality of second graphs of the set of the street view images, wherein the first graph includes nodes representing interest points in the image captured by the mobile device and the plurality of second graphs includes nodes representing interest points in the set of the street view images. The method further comprises determining, by the mobile device, a location of the mobile device, based on relevance between the first graph and the plurality of the second graphs.

In another aspect, a computer system for determining a location using street view images is provided. The computer system comprises a processing unit and a memory coupled to the processing unit and storing instructions thereon. The instructions, when executed by the processing unit, perform acts including: obtaining, by a mobile device, an image captured by the mobile device; obtaining, by the mobile device, a first graph of the image captured by the mobile device and a plurality of second graphs of the set of the street view images, wherein the first graph includes nodes representing interest points in the image captured by the mobile device and the plurality of the second graphs includes nodes representing interest points in the set of the street view image; and determining, by the mobile device, a location of the mobile device, based on relevance between the first graph and the plurality of the second graphs.

In yet another aspect, a computer program product for determining a location using street view images is provided. The computer program product is tangibly stored on a non-transient machine-readable medium and comprises machine-executable instructions. The instructions, when executed on a mobile device, cause the mobile device to perform: obtaining, by the mobile device, an image captured by the mobile device; obtaining, by the mobile device, a first graph of the image captured by the mobile device and a plurality of second graphs of the set of the street view images, wherein the first graph includes nodes representing interest points in the image captured by the mobile device and the plurality of second graphs includes nodes representing interest points in the set of the street view image; and determining, by the mobile device, a location of the mobile device, based on relevance between the first graph and the plurality of the second graphs.

According to embodiments of the present disclosure, the location of the mobile device can be determined accurately by matching the captured image and the street view images from the perspective of the spatial relationships between interest points. That is, the location of a user can be determined by comparing the image taken from the mobile device and the street view images even if the GPS signal is not reliable. Moreover, by use of the horizontal and vertical position relationships between interest points, the embodiments of the present disclosure can match an image with the panorama view images effectively, and panorama view distortion can be handled by use of rotations, thereby achieving a better match at a global level. Furthermore, in a case where the destination is blocked by other object, the embodiments of the present disclosure can still determine the location of the destination based on the surrounding structure of the destination.

It is to be understood that the Summary is not intended to identify key or essential features of embodiments of the present disclosure, nor is it intended to be used to limit the scope of the present disclosure. Other features of the present disclosure will become easily comprehensible through the description below.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to". The term "a" is to be read as "one or more" unless otherwise specified. The term "based on" is to be read as "based at least in part on". The term "one embodiment" and "an embodiment" are to be read as "at least one embodiment." The term "another embodiment" is to be read as "at least one other embodiment."

In some examples, values, procedures, or apparatus are referred to as "lowest", "best", "minimum", or the like. It will be appreciated that such descriptions are intended to indicate that a selection among many used functional alternatives can be made, and such selections need not be better, smaller, or otherwise preferable to other selections.

Figure 1:
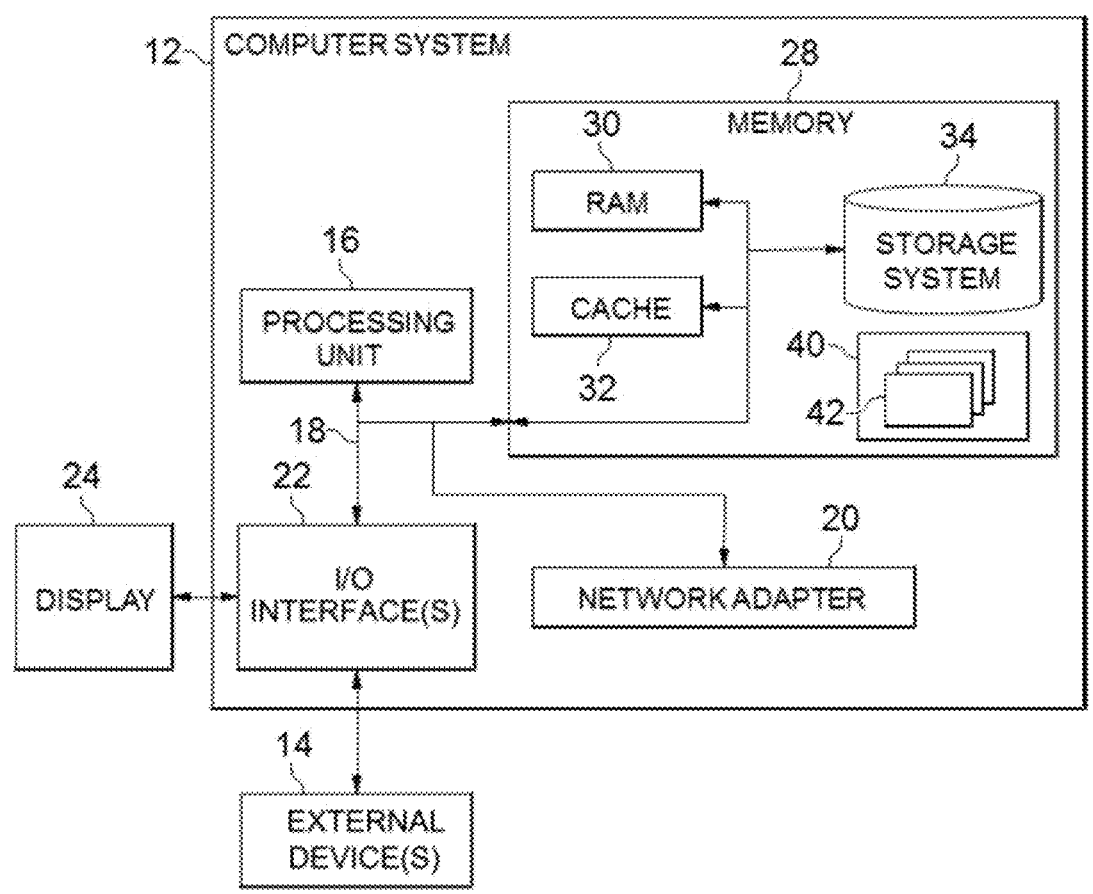
FIG. 1 is a block diagram of a computer system of a mobile device for determining a location using street view images, in accordance with one embodiment of the present invention.

Reference is first made to FIG. 1, in which computer system 12 which is applicable to implement the embodiments of the present invention is shown. Computer system 12 is only illustrative and is not intended to suggest any limitation as to the scope of use or functionality of embodiments of the disclosure described herein.

As shown in FIG. 1, the components of computer system 12 may include, but are not limited to, one or more processors or processing units 16, system memory 28, and bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system 12 may also communicate with one or more external devices 14 such as a keyboard, a pointing device, display 24, and the like. One or more devices that enable a user to interact with computer system 12; and/or any devices (e.g., network card, modem, etc.) that enable computer system 12 to communicate with one or more other computing devices. Such communication can occur via input/output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that, although not shown, other hardware and/or software components could be used in conjunction with computer system 12. Examples include, but are not limited to: microcode, device drivers, redundant processing units, external disk drive arrays, RAID systems, tape drives, and data archival storage systems, and the like. In some embodiments, the computer system 12 may communicate with DBMS (not shown) via network adapter 20.

In computer system 12, I/O interfaces 22 may support one or more of various different input devices that can be used to provide input to computer system 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Conventionally, a mobile device is generally equipped with a GPS module, and most of the time it can provide a reliable navigation to a destination. However, in large cities with high-rise and dense buildings, the GPS signal is often blocked or too weak to provide a reliable location, and the GPS signal is also weak when the mobile device is under an overhead structure such as scaffold. In a particular case, the mobile device may do not have a GPS module to receive the GPS signal. Moreover, many of the navigation applications do not have perfect location-to-address mapping, and the actual location of an address may be different from the location provided by the navigation system. Thus, traditional methods cannot determine the current location of the mobile device in the case that the GPS signal is not reliable.

In order to at least partially solve the above and other potential problems, a new approach for determining a location using street view images is provided. According to embodiments of the present disclosure, the location of the mobile device can be determined accurately by matching the captured image and the street view images from the perspective of the spatial relationships between interest points. That is, the location of a user can be determined by comparing the image taken from the mobile device and the street view images even if the GPS signal is not reliable.

Moreover, by use of the horizontal and vertical position relationships between interest points, the embodiments of the present disclosure can match an image with the panorama view images effectively, and panorama view distortion can be handled by use of rotations, thereby achieving a better match at a global level. Furthermore, in a case where the destination is blocked by other object, the embodiments of the present disclosure can still determine the location of the destination based on the surrounding structure of the destination.

Figure 2:
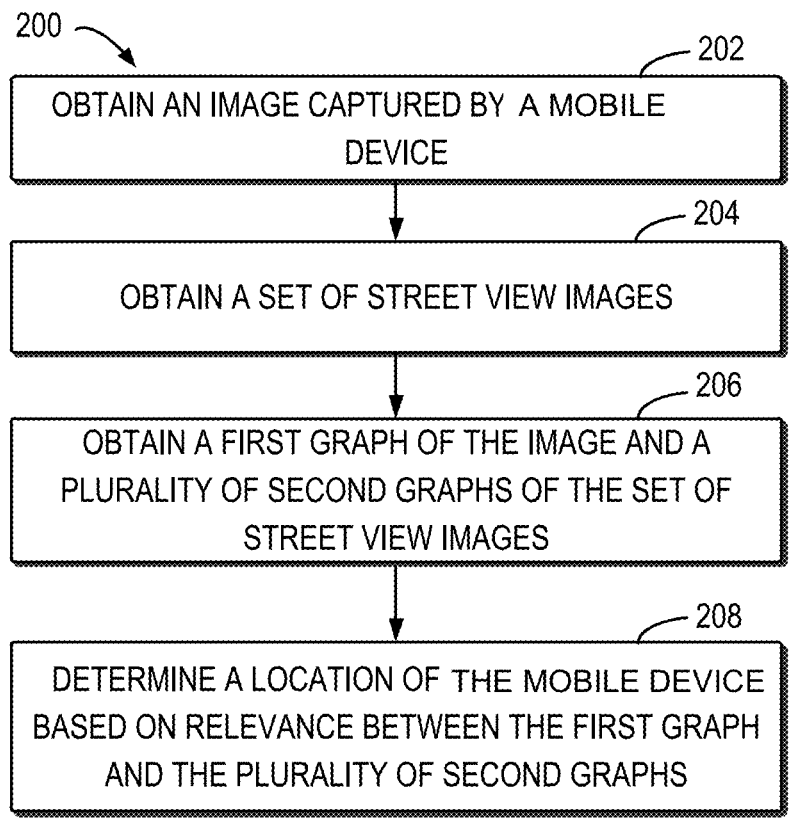
FIG. 2 is flowchart of a method for determining a location using street view images, in accordance with one embodiment of the present invention.

FIG. 2 is flowchart 200 of a method for determining a location using street view images, in accordance with one embodiment of the present invention. It is to be understood that the method may be performed by processing unit 16 with reference to FIG. 1.

At step 202, a mobile device obtains an image captured by the mobile device. For example, the mobile device is a mobile phone. Generally, the mobile device has the ability to take imagery data such as a picture or a video, and a user of the mobile device may take a photo of user's surroundings to generate an image. For example, the image may be obtained by a person with up-right position on the ground. In some embodiments, the captured image may be geospatially tagged with geographic information, and the geographic information may be used to determine a general geographic area where the mobile device is located. For example, the geographic information may indicate the latest geographical coordinate detected by the mobile device or an area code where the mobile device is located. In some embodiments, the user may manually input a general location (such as a street name) into the mobile device or manually select an area from the Graphical User Interface (GUI) displayed on the mobile device.

At step 204, the mobile device obtains a set of street view images. For example, the street view images may be taken by a vehicle-mounted camera along a street and are stored in one or more databases in a computing network. The street view images may be retrieved through some public Application Program Interfaces (APIs) from a local or remote server in a computing network.

Figure 3:
FIG. 3 illustrates an example street view image, in accordance with one embodiment of the present invention.

For example, FIG. 3 illustrates street view image 300. As shown in FIG. 3, the street view image is generally a panorama image, which is a special kind data. Specifically, the panorama image is generally obtained by multiple cameras (such as 8 cameras, 15 cameras) simultaneously, and it is actually synthesized from a plurality of image obtained at a given location at that point. Moreover, since the panorama image does not follow traditional pin-hole camera model, traditional computer vision geometry processing ways (such as fundamental matrix, affine transformation, epipolar lines, and so forth) cannot be directly applied to the panorama image for image matching.

At step 206, the mobile device obtains a first graph of the image and a plurality of second graphs of the set of street view images. For example, the first graph and the plurality of second graphs may be generated by the mobile device locally through image recognition. Alternatively, the first graph and the plurality of second graphs may be obtained from a remote computer system or server in a computing network. Each of the first graph and the plurality of second graphs includes a plurality of nodes and a plurality of edges between nodes, and each node represents a specific image point such as an interest point. In some embodiments, the nodes may represent detectable objects in an image, such as trees, buildings, roads. Alternatively, the nodes may be primitive geometric shapes such as lines and corners or other interest points. Some implementations of step 206 will be discussed in late paragraphs with reference to FIG. 4.

At step 208, the mobile device determines the location of the mobile device based on relevance between the first graph and the plurality of second graphs. For example, the captured image and the set of street view images are matched by use of the partial graph matching, and one street image which best matches the captured image will be determined as the most similar image. Then, for example, the current location of the mobile device may be determined based on the best matched street image. Some implementations of step 208 will be discussed in late paragraphs with reference to FIG. 7.

Generally, the street view images are obtained by cameras with up-right position on the ground, and the image captured by the mobile device is also obtained by the person with up-right position on the ground. Therefore, if a first object is on the left side of a second object in the street view images, then the first object should appear also on the left side of the second object in the image captured by the mobile device. Accordingly, according to the method shown in FIG. 2, the location of the mobile device can be determined accurately by matching the captured image and the street view images from the perspective of the spatial relationships between interest points. An image is taken from the mobile device matches the street view images, and the location of the mobile device is then determined by analyzing the matching results.

In some embodiments, the set of street view images may be obtained based on the geographic information from the mobile device. For example, the street view images within the area determined from the geographic information are selected to match the captured image. Accordingly, only the street view images near the area where the mobile device is located are obtained, thereby reducing the number of street view images to be matched.

In some embodiments, the determined location can be displayed on a map application on the mobile device, and a navigational recommendation to a destination may be provided on the map application. Thus, embodiments of the present disclosure can also provide a navigational recommendation to reach the actual destination. It should to be understood that the present disclosure may be positioned as a supplemental functionality to applicable navigation application instead of a standalone application, although it can also run as a standalone application.

Figure 4:
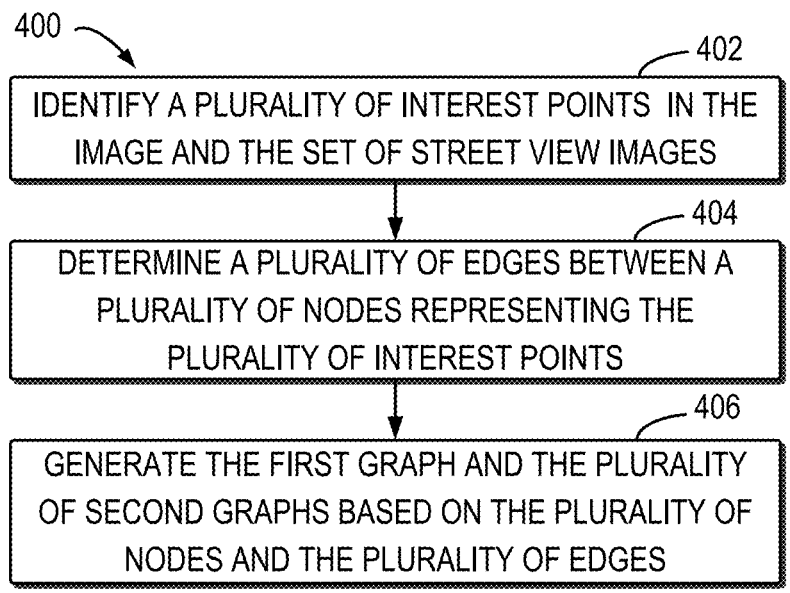
FIG. 4 is a flowchart of a method for generating a graph of an image, in accordance with one embodiment of the present invention.

FIG. 4 is flowchart 400 of a method for generating a graph of an image, in accordance with one embodiment of the present invention. It will be understood that the method may be regarded as a specific implementation of step 206 in FIG. 2 and that the method may be performed by processing unit 16 in FIG. 1.

At step 402, the mobile device identifies a plurality of interest points in the first graph and a plurality of interest points in the plurality of second graphs. An interest point is a point in an image that represents some specific image parts, for example, the interest point may represent a specific object, a specific geometric shape, and so on. Any suitable technology, either currently known or to be developed in future, can be applied to identify interest points in an image.

At step 404, the mobile device determines a plurality of edges between a plurality of nodes. Each node represents an interest point. For example, each edge represents a line joining two nodes and has an edge value representing a spatial relationship between the two nodes. Since there is significant distortion in a panorama image, the distance between the nodes do not indicate the true relationship between them, for example, objects that are closer to the camera may show larger distance even they are closer to each other. Thus, according to embodiments of the present disclosure, the relative position of two nodes in the graph may be represented as an edge value in order to avoid the impact of the distortion.

In some embodiments, each edge value has a horizontal value and a vertical value, and the horizontal value represents the horizontal position relationship between the two nodes while the vertical value represents the vertical position relationship between the two nodes. For example, the edge value between a first node and a second node may be represented as E(first node, second node), such as E(A, B)=(−1, 1), where the horizontal value "−1" represents the horizontal relative position that node A is relative node B, and the vertical value "1" represents the vertical relative position that node A is relative node B. So, in this example, it means that node A is on the right of node B and node A is above node B. It should to be understood that other embodiments for the edge representation may be also possible. For example, E(A, B) may be represented as characters such as E(A, B)=(W, N), which means that node A lies northwest in relative to node B. In some embodiments, any two nodes in one graph may have an edge value. Alternatively, only adjacent two nodes in one graph may have an edge value, thereby reducing complexity of the calculation.

In some embodiments, the first set of edge values for the first graph may be determined, and each of the first set of edge values may represent a position relationship between two of the plurality of nodes in the first graph. Additionally, the second set of edge values for the second graph in the plurality of second graphs may be also determined, and each of the second set of edge values may represent a position relationship between two of the plurality of nodes in the second graph.

At step 406, the mobile device generates the first graph and the plurality of second graphs, based on the plurality of nodes and the plurality of edges. For example, each of the first graph and the plurality of second graphs may include a plurality of nodes and the edge values between these nodes. Some example graphs are illustrated in FIG. 5C and FIG. 6C.

In some embodiments, a match degree between the first set of edge values and the second set of edge values may be determined. If the match degree exceeds a predefined threshold, for example the predefined threshold may be obtained from the machine learning process for the training data, it means the first graph and the second graph are partly matched. In response to determining that the match degree exceeds a predefined threshold, the mobile device obtains a location of the second graph for a street view image and determines this location of the street view image as the current positon of the mobile device. Otherwise, if the match degree is below the predefined threshold, the first graph and the second graph are determined to be unrelated with each other. By use of the predefined threshold to determine whether two images are related with each other, the present disclosure is still able to determine an accurate location based on the surrounding structure of the object even if the object is block by other objects, for example, a store is blocked by a bus. In this way, the present disclosure incorporates the context information of the object into the matching process.

In some embodiments, assume E1 is an edge value in the first graph and E2 is an edge value in the second graph, if E1=E2, then F(E1, E2)=1, which means that the two edge values are same. Otherwise, F(E1, E2)=0, which means that the two edge values are different. In some embodiments, all the edge values in each of two graph may be counted, and the similarity between the two graphs may be determined based on the counter of each type of values. Alternatively, or additionally, some existing graph or sub-graph matching methods may be used to determine the similarity between two graphs, for example, Xu, Yang et al, "A weighted common subgraph matching algorithm," IEEE Transactions on Neural Networks and Learning Systems, 2015. It should be understood that any suitable technology, either currently known or to be developed in future, may be applied to determine the similarity between two graphs.

In some embodiments, nodes in a graph may be clustered into a plurality of groups according to the image features of each node, and each group share similar image feature pattern. For example, nodes associated with trees may be grouped into a first group, nodes associated with buildings may be grouped into a second group, and nodes associated with streets may be grouped into a third group. In some embodiments, the edges between nodes that belong to the same group are compared between two graphs. For example, the first edge in the first graph between nodes that belong to the first group is compared only with the second edge in the second graph between nodes that also belong to the first group instead of the second group or other groups. Accordingly, the accuracy of the comparison between two graphs may be increased by only comparing edges related to the same group. In some embodiments, the comparison of edges between two graphs may be performed in a predetermined sequence, for example, from top to bottom, or from left to right.

In some embodiments, F(E1, E2) may be weighted as F'(E1, E2), and F'(E1, E2)=α* F(E1, E2), wherein a denotes a weight determined from the features of the image. For example, assume the captured image has two nodes A1 and B1 which represent corner points, and the node A1 may have a set of features M_A1 and the node B1 may have a set of features M_B1, for example, the features may be affine-invariant gradient descriptors of a corner. Similarly, the street view image has two nodes A2 and B2 which represent corner points, and the node A2 may have a set of features M_A2 and the node B2 may have a set of features M_B2, for example, the features may be also affine-invariant gradient descriptors of a corner. In some embodiments, the weight α may be determined as α=(S(M_A1, M_A2)*S(M_B1, M_B2)/(S(M_A1, M_A2)+S(M_B1, M_B2), where S(M_A1, M_A2) denotes the similarity between M_A1 and M_A2. According to embodiments of the present disclosure, by use of the weight, the accuracy of the comparison between two graphs may be increased.

Figure 5A:
FIG. 5A illustrates an example image captured by a mobile device, in accordance with one embodiment of the present invention.

FIG. 5A illustrates example image 500 captured by a mobile device, in accordance with one embodiment of the present invention. For example, the user is located at a square, but the user cannot use the GPS to determine user's location because the GPS signal is blocked by the surrounding tall buildings. According to embodiments of the present disclosure, the user may use user's mobile device to take a picture vertically to generate image 500.

Figure 5B:
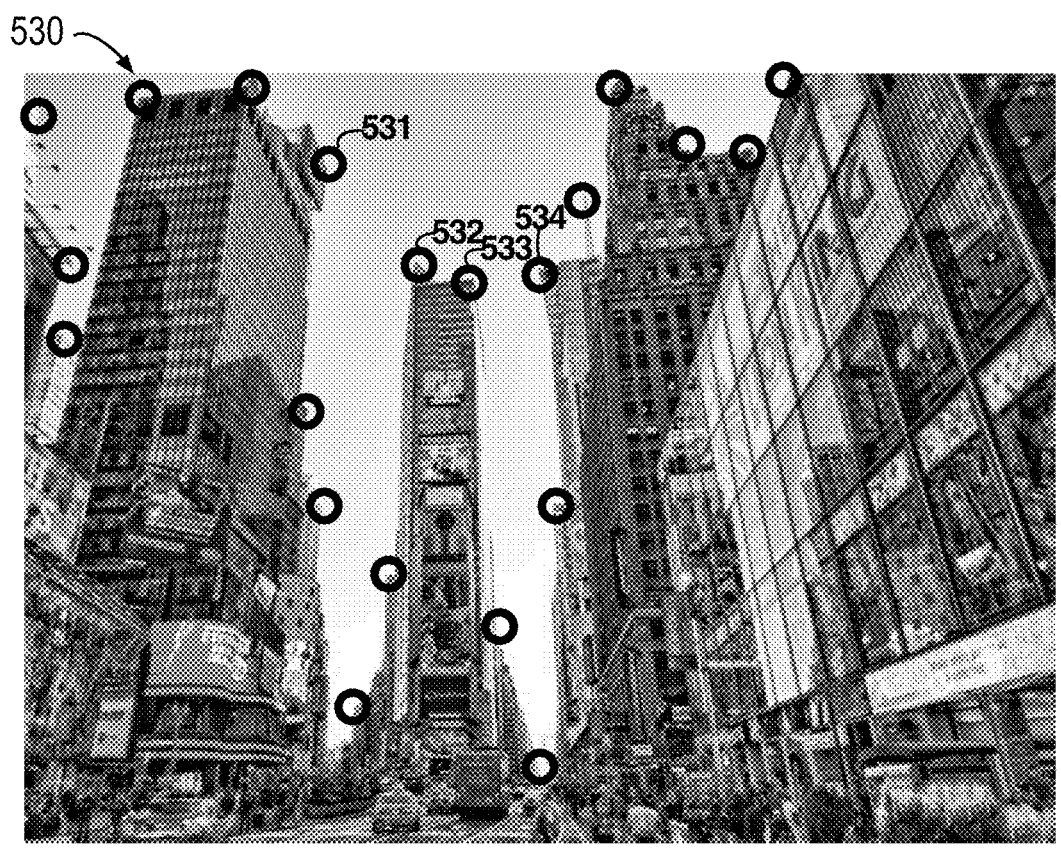
FIG. 5B illustrates the captured example image (shown in FIG. 5A) tagged with interest points, in accordance with one embodiment of the present invention.
Figure 5C:
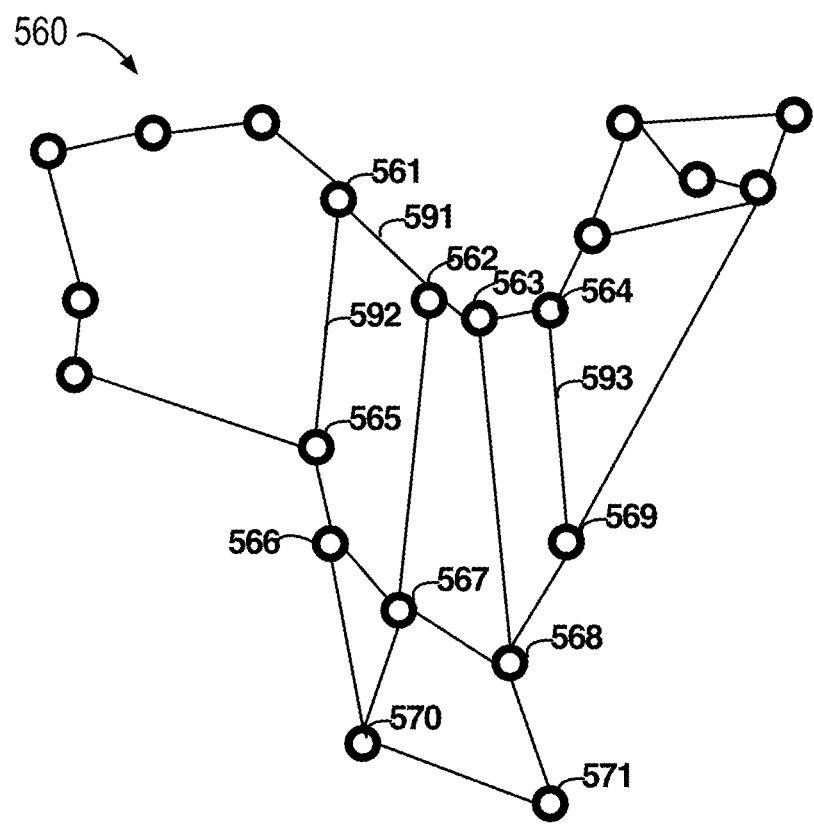
FIG. 5C illustrates an example graph generated from the captured image, in accordance with one embodiment of the present invention.

FIG. 5B illustrates the captured example image 500 (shown in FIG. 5A) tagged with interest points, in accordance with one embodiment of the present invention. In tagged image 530, some interest points are identified, for example, interest points 531, 532, 533 and 534. It should to be understood, to avoid confusion of illustration, only some interest points are tagged with numerals.

FIG. 5C is example graph 560 generated from the captured image, in accordance with one embodiment of the present invention. For example, graph 560 may be generated based on the interest points identified in the image 530 (shown in FIG. 5B), and these interest points may be used as nodes in the graph, such as nodes 561, 562, 563, 564, 565, 566, 567, 568, 569, 570, and 571. The adjacent two nodes may have an edge (such as edges 591, 592, and 593) connecting them. The edge value for the edge may represent the spatial relationship between the two nodes. Still in reference to the above example representation, the edge value for edge 592 may be represented as E(node 561, node 565)=(−1, −1), and the edge value for edge 593 may be represented as E(node 564, node 569)=(1, −1). It should to be understood, to avoid confusion of illustration, only some nodes and edges are tagged with numerals.

Figure 6A:
FIG. 6A illustrates an example street view image, in accordance with one embodiment of the present invention.

FIG. 6A illustrates example street view image 600, in accordance with one embodiment of the present invention. For example, street view image 600 is obtained from a database storing the street view images, and street view image 600 may be a nearby image determined from the geographic information of the mobile device.

Figure 6B:
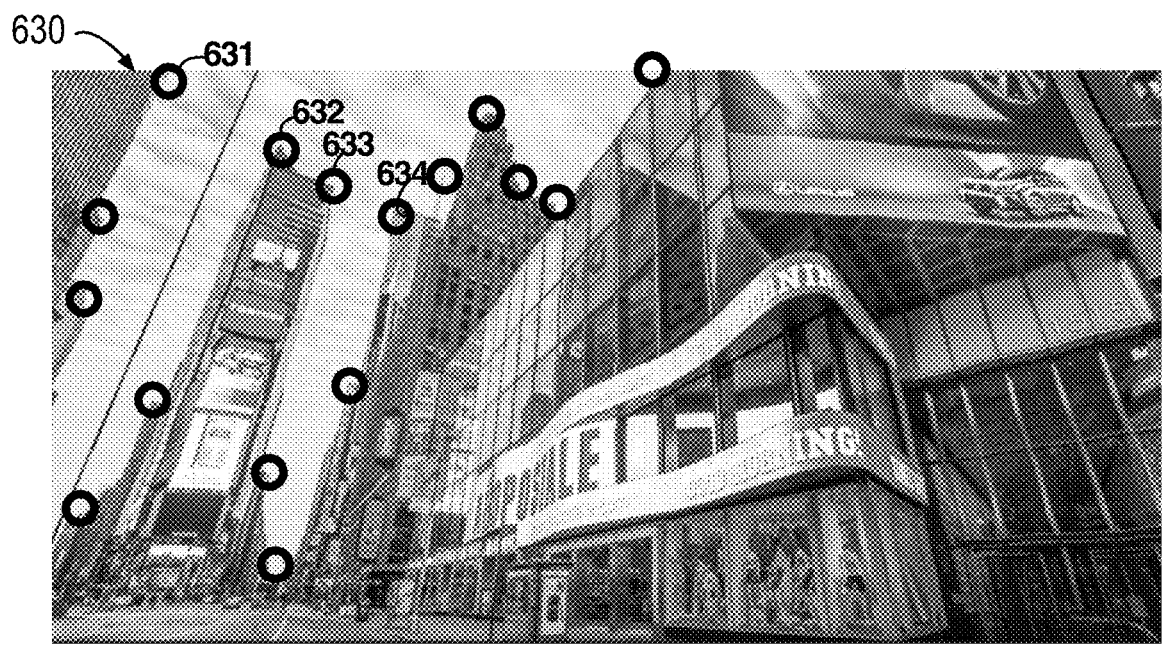
FIG. 6B illustrates the example street view image (shown in FIG. 6A) tagged with interest points, in accordance with one embodiment of the present invention.
Figure 6C:
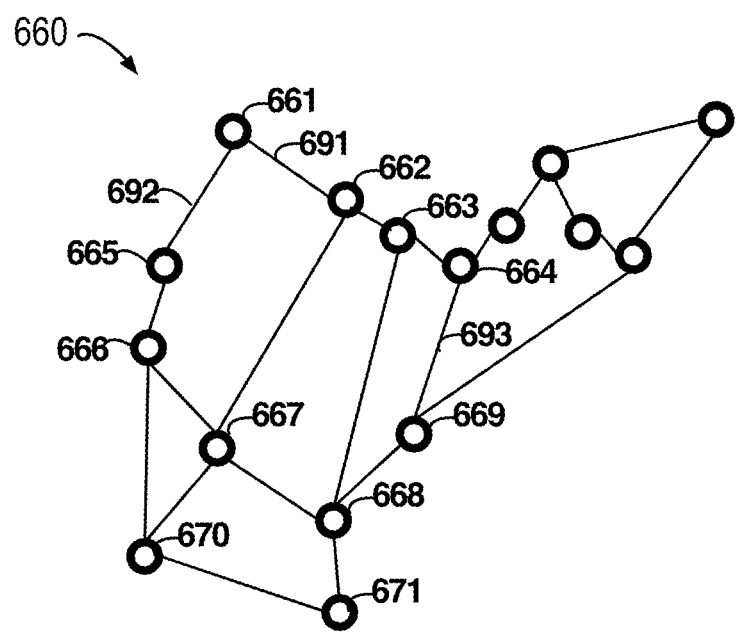
FIG. 6C is an example graph generated from the example street view image, in accordance with one embodiment of the present invention.

FIG. 6B illustrates example street view image 600 (shown in FIG. 6A) tagged with interest points, in accordance with one embodiment of the present invention. In image 630, some interest points are identified, for example, interest points 631, 632, 633, and 634. It should to be understood, to avoid confusion of illustration, only some interest points are tagged with numerals.

FIG. 6C is example graph 660 generated from the example street view image, in accordance with one embodiment of the present invention. For example, graph 660 may be generated based on the interest points identified in image 630, and these interest points may be used as nodes in the graph, such as nodes 661, 662, 663, 664, 665, 666, 667, 668, 669, 670, and 671. As described above, the adjacent two nodes may have a connecting edge (such as edges 691, 692, and 693), and the edge value for the edge may represent the spatial relationship between the two nodes. Still in the above example representation, the edge value for edge 692 may be represented as E(node 661, node 665)=(−1, −1), and the edge value for edge 693 may be represented as E(node 664, node 669)=(−1, −1). It should to be understood, to avoid confusion of illustration, only some nodes and edges are tagged with numerals.

According to embodiments of the present disclosure, since the part of nodes 561-571 in graph 560 and the part of nodes 661-671 in graph 660 are similar, image 500 and image 600 may be determined to be matched with each other. According to embodiments of the present disclosure, the matching process between two graphs may be carried out as the partial graph matching; for example, a standard partial graph matching process with a specific edge value representation. In this way, the location of the mobile device can be determined accurately by partly matching two graphs generated from the images.

Figure 7:
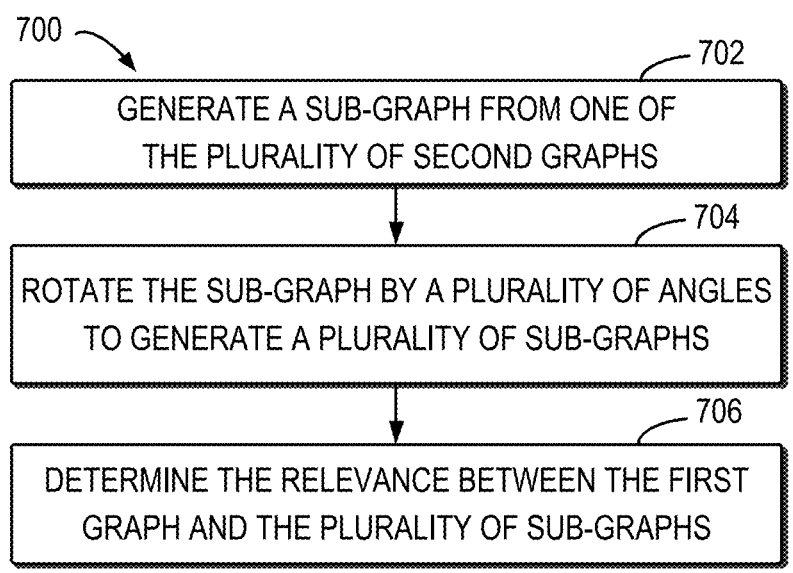
FIG. 7 is a flowchart of a method for rotating a graph generated from an image, in accordance with one embodiment of the present invention.

FIG. 7 is flowchart 700 of a method for rotating a graph generated from an image, in accordance with one embodiment of the present invention. It will be understood that the method may be regarded as a specific implementation of step 208 in FIG. 2 and that the method may be performed by processing unit 16 in FIG. 1.

Generally, in a panorama view image, distortion can dramatically change the position of an object. However, the relative positions among the objects in the spatial remain unchanged, and the distortion at the local part of the image can be processed by use of rotation.

At step 702, the mobile device generates a sub-graph from one of the plurality of second graphs. For example, a second graph generated from a street view image may be divided into several sub-graphs, such as four sub-graphs. In some embodiments, a horizontal scan is performed from left to right with a width. For example, the width may be determined based on a predetermined number of pixels (such as 100 pixels) in the captured image or the street view image. Alternatively, the width may be determined based on a predetermined ratio (such as 10%) of the captured image or the street view image.

At step 704, the mobile device rotates each sub-graph by plurality of angles to generate a plurality of sub-graphs. For example, each sub-graph may be rotated by four angles, such as 15°, 30°, −15° and −30°, that is, the sub-graph may be rotated by 15° and 30° clockwise, and meanwhile the sub-graph may be also rotated by 15° and 30° counterclockwise. Therefore, the plurality of sub-graphs may be generated to match the image captured by the mobile device.

According to embodiments of the present disclosure, during the rotation, the relative positions among all related nodes in the sub-graph maintain the same. However, individual node-to-node edge value may change, for example, if a building is rotated such that it tilts to the left, most of the horizontal relative positions will be reversed.

At step 706, the mobile device determines the relevance between the first graph and the plurality of sub-graphs, and then the mobile device determines the location of the mobile device based on the determined relevance between the first graph and the plurality of sub-graphs. The first graph of the captured image may be matched with the rotated sub-graphs. The street view images generally have significant distortion. By use of the rotation of the sub-graph, a better match may be achieved at a global level. In some embodiments, the sub-graphs may be generated according to different rules iteratively.

Figure 8C:
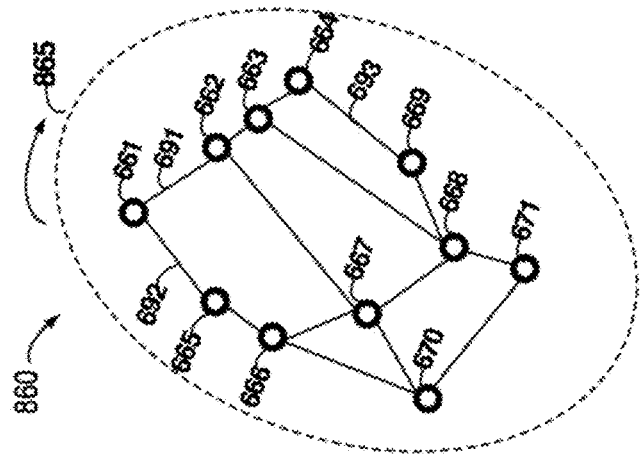
FIG. 8A-8C are schematic diagrams illustrating rotations of an example graph, in accordance with one embodiment of the present invention.
Figure 8B:
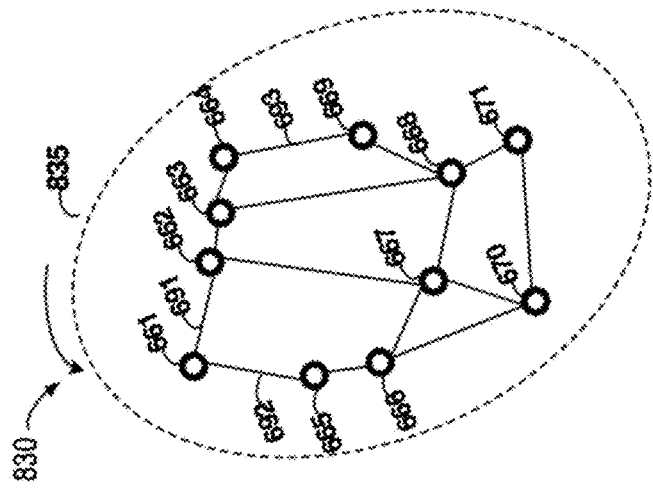
Figure 8A:
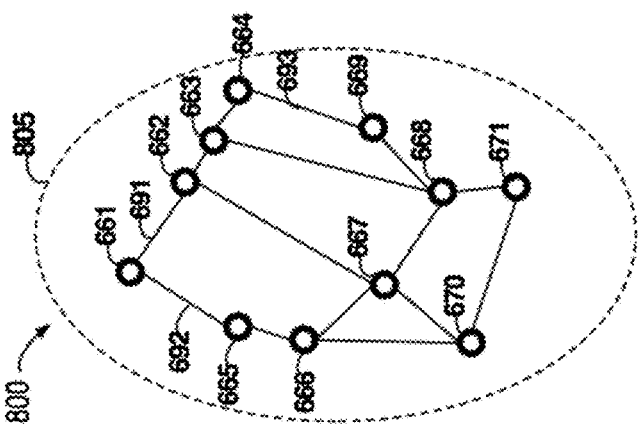

FIGS. 8A-8C are schematic diagrams illustrating rotations of an example graph, in accordance with one embodiment of the present invention. FIG. 8A is schematic diagram 800 which represents a sub-graph 805 of graph 660 shown in FIG. 6C. FIG. 8B is schematic diagram 830 in which sub-graph 805 is rotated 30° counterclockwise to generate a new sub-graph—sub-graph 835. FIG. 8C is schematic diagram 860 in which sub-graph 805 is rotated 30° clockwise to generate a new sub-graph—sub-graph 865.

With reference to graph 560 in FIG. 5C, the edge value for edge 593 is represented as E(node 564, node 569)=(1, −1). In graphs 805 and 865, the edge value for edge 693 may be represented as E(node 664, node 669)=(−1, −1), which is different from E(node 564, node 569). However, in graphs 835, the edge value for edge 693 may be represented as E(node 664, node 669)=(1, −1), which is the same as E(node 564, node 569). It is found that sub-graph 835 matches graph 560 best, compared with original sub-graph 805 and another rotated sub-graph 865. Thus, by use of the rotation of the sub-graph, a better match may be achieved at a global level.

According to embodiments of the present disclosure, if a user wants to go to a restaurant at an address, the user travels to the neighborhood of the restaurant. Because of the tall buildings around the user, the GPS system is not working well, and the user doesn't know where the user is located. Knowing that the user is close to user's destination, the user takes a picture of the scene around the user using the mobile device, and the mobile device then attempts to match the captured image with the street view images, and determines the location of the user on the map. Additionally, the present discourse may provide a navigational recommendation to the user to reach the destination.

According to embodiments of the present disclosure, if the user can obtain some images of a restaurant from a website of the restaurant, then embodiments of the present disclosure may pinpoint the actual location of the restaurant by matching its image with the street view images.

Accordingly, the present disclosure may utilize the image captured by the mobile device and street view images to help localize a location of the mobile device, and further provides navigational recommendations to the mobile device owner to reach user's exact destination. Since the present disclosure is based on part matching, the present disclosure is able to handle situations where the destination is occluded, but its surroundings are still visible in the image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, by a mobile device, an image captured by the mobile device;
   obtaining, by the mobile device, a set of street view images;
   obtaining, by the mobile device, a first graph of the image captured by the mobile device and a plurality of second graphs of the set of the street view images, the first graph including nodes representing interest points in the image captured by the mobile device, and the plurality of the second graphs including nodes representing interest points in the set of the street view images;
   identifying, by the mobile device, a plurality of interest points in the image captured by the mobile device and the set of the street view images;
   determining, by the mobile device, a plurality of edges between a plurality of nodes representing the plurality of the interest points;
   generating, by the mobile device, the first graph and the plurality of the second graphs, based on the plurality of nodes and the plurality of edges; and
   determining, by the mobile device, a location of the mobile device, based on relevance between the first graph and the plurality of the second graphs.

2. The method of claim 1, wherein the determining a location of the mobile device comprises:
   generating, by the mobile device, a sub-graph from one of the plurality of the second graphs;
   rotating, by the mobile device, the sub-graph by a plurality of angles to generate a plurality of sub-graphs; and
   determining, by the mobile device, relevance between the first graph and the plurality of the sub-graphs; and
   determining, by the mobile device, the location of the mobile device, based on the relevance between the first graph and the plurality of the sub-graphs.

3. The method of claim 1, wherein the determining the plurality of the edges between the plurality of the nodes representing the plurality of interest points comprises:
   determining, by the mobile device, a horizontal value, based on a horizontal position relationship between two nodes;
   determining, by the mobile device, a vertical value based on a vertical position relationship between the two nodes; and
   determining, by the mobile device, an edge value representing a position relationship between the two nodes, based on the horizontal value and the vertical value.

4. The method of claim 1, wherein the determining the plurality of the edges between the plurality of the nodes representing the plurality of the interest points comprises:
   determining, by the mobile device, a first set of edge values, each of which representing a position relationship between two of the plurality of the nodes in the first graph; and
   determining, by the mobile device, a second set of edge values, each of which representing a position relationship between two of the plurality of the nodes in one of the plurality of the second graphs.

5. The method of claim 1, wherein the determining the location of the mobile device comprises:
   determining, by the mobile device, a match degree between the first set of the edge values and the second set of the edge values; and
   in response to determining that the match degree exceeds a predefined threshold, obtaining, by the mobile device, a location of the one of the plurality of the second graphs, and determining, by the mobile device, the location of the one of the plurality of the second graphs as the location of the mobile device.

6. The method of claim 5, wherein the determining the match degree between the first set of the edge values and the second set of the edge values comprises:
   dividing, by the mobile device, nodes in the first graph and the plurality of second graphs into a plurality of groups according to an image feature of each node; and
   determining, by the mobile device, a match degree between a first edge value in the first set of the edge values and a second edge value in the second set of the edge values, first two nodes associated with the first edge value and second two nodes associated with the second edge value belonging to a same group of the plurality of groups.

7. The method of claim 1, further comprising:
   displaying, by the mobile device, the location of the mobile device on a map application; and
   providing, by the mobile device, a navigational recommendation to a destination on the map application.

8. The method of claim 1, the obtaining the set of the street view images comprises:
   determining, by the mobile device, geographic information of the mobile device; and
   obtaining, by the mobile device, the set of the street view images based on the geographic information.

9. A computer system comprising:
a processing unit;
a memory coupled to the processing unit and storing instructions thereon, the instructions, when executed by the processing unit, performing acts including:
  obtaining, by a mobile device, an image captured by the mobile device;
  obtaining, by the mobile device, a set of street view images;
  obtaining, by the mobile device, a first graph of the image captured by the mobile device and a plurality of second graphs of the set of the street view images, the first graph including nodes representing interest points in the image captured by the mobile device, and the plurality of the second graphs including nodes representing interest points in the set of the street view images;
  identifying, by the mobile device, a plurality of interest points in the image captured by the mobile device and the set of the street view images;
  determining, by the mobile device, a plurality of edges between a plurality of nodes representing the plurality of the interest points;
  generating, by the mobile device, the first graph and the plurality of the second graphs, based on the plurality of nodes and the plurality of edges; and
  determining, by the mobile device, a location of the mobile device, based on relevance between the first graph and the plurality of the second graphs.

10. The computer system of claim 9, wherein the determining the location of the mobile device comprises:
  generating, by the mobile device, a sub-graph from one of the plurality of the second graphs;
  rotating, by the mobile device, the sub-graph by a plurality of angles to generate a plurality of sub-graphs; and
  determining, by the mobile device, relevance between the first graph and the plurality of the sub-graphs; and
  determining, by the mobile device, the location of the mobile device, based on the relevance between the first graph and the plurality of the sub-graphs.

11. The computer system of claim 9, wherein the determining the plurality of the edges between the plurality of the nodes representing the plurality of interest points comprises:
  determining, by the mobile device, a horizontal value, based on a horizontal position relationship between two nodes;
  determining, by the mobile device, a vertical value based on a vertical position relationship between the two nodes; and
  determining, by the mobile device, an edge value representing a position relationship between the two nodes, based on the horizontal value and the vertical value.

12. The computer system of claim 9, wherein the determining the plurality of the edges between the plurality of the nodes representing the plurality of the interest points comprises:
  determining, by the mobile device, a first set of edge values, each of which representing a position relationship between two of the plurality of the nodes in the first graph; and
  determining, by the mobile device, a second set of edge values, each of which representing a position relationship between two of the plurality of the nodes in one of the plurality of the second graphs.

13. The computer system of claim 9, wherein the determining the location of the mobile device comprises:
  determining, by the mobile device, a match degree between the first set of the edge values and the second set of the edge values; and
  in response to determining that the match degree exceeds a predefined threshold, obtaining, by the mobile device, a location of the one of the plurality of the second graphs, and determining, by the mobile device, the location of the one of the plurality of the second graphs as the location of the mobile device.

14. The computer system of claim 13, wherein the determining the match degree between the first set of the edge values and the second set of the edge values comprises:
  dividing, by the mobile device, nodes in the first graph and the plurality of second graphs into a plurality of groups according to an image feature of each node; and
  determining, by the mobile device, a match degree between a first edge value in the first set of the edge values and a second edge value in the second set of the edge values, first two nodes associated with the first edge value and second two nodes associated with the second edge value belonging to a same group of the plurality of groups.

15. The computer system of claim 9, the instructions, when executed by the processing unit, further performing acts including:
  displaying, by the mobile device, the location of the mobile device on a map application; and
  providing, by the mobile device, a navigational recommendation to a destination on the map application.

16. The computer system of claim 9, the instructions, when executed by the processing unit, further performing acts including:
  determining, by the mobile device, geographic information of the mobile device; and
  obtaining, by the mobile device, the set of the street view images based on the geographic information.

17. A computer program product being tangibly stored on a non-transient machine-readable medium and comprising machine-executable instructions, the instructions, when executed on a mobile device, causing the mobile device to perform:
  obtaining, by the mobile device, an image captured by the mobile device;
  obtaining, by the mobile device, a set of street view images;
  obtaining, by the mobile device, a first graph of the image captured by the mobile device and a plurality of second graphs of the set of the street view images, the first graph including nodes representing interest points in the image captured by the mobile device, and the plurality of the second graphs including nodes representing interest points in the set of the street view images;
  identifying, by the mobile device, a plurality of interest points in the image captured by the mobile device and the set of the street view images;
  determining, by the mobile device, a plurality of edges between a plurality of nodes representing the plurality of the interest points;
  generating, by the mobile device, the first graph and the plurality of the second graphs, based on the plurality of nodes and the plurality of edges; and
  determining, by the mobile device, a location of the mobile device, based on relevance between the first graph and the plurality of the second graphs.

18. The computer program product of claim 17, wherein the determining the location of the mobile device comprises:

generating, by the mobile device, a sub-graph from one of the plurality of the second graphs;

rotating, by the mobile device, the sub-graph by a plurality of angles to generate a plurality of sub-graphs; and determining, by the mobile device, relevance between the first graph and the plurality of the sub-graphs; and determining, by the mobile device, the location of the mobile device, based on the relevance between the first graph and the plurality of the sub-graphs.

19. The computer program product of claim 17, wherein the determining the plurality of the edges between the plurality of the nodes representing the plurality of interest points comprises:

determining, by the mobile device, a horizontal value, based on a horizontal position relationship between two nodes;

determining, by the mobile device, a vertical value based on a vertical position relationship between the two nodes; and determining, by the mobile device, an edge value representing a position relationship between the two nodes, based on the horizontal value and the vertical value.

20. The computer program product of claim 17, wherein the determining the plurality of the edges between the plurality of the nodes representing the plurality of the interest points comprises:

determining, by the mobile device, a first set of edge values, each of which representing a position relationship between two of the plurality of the nodes in the first graph; and determining, by the mobile device, a second set of edge values, each of which representing a position relationship between two of the plurality of the nodes in one of the plurality of the second graphs.

* * * * *